United States Patent [19]
Pool et al.

[11] 3,979,105
[45] Sept. 7, 1976

[54] VALVE WITH IMPROVED FLOW PASSAGE

[75] Inventors: Eldert B. Pool, Pittsburgh; Raymond L. Schweitzer, Allison Park, both of Pa.

[73] Assignee: Rockwell International Corporation, Pittsburgh, Pa.

[22] Filed: Apr. 3, 1975

[21] Appl. No.: 564,956

Related U.S. Application Data

[63] Continuation of Ser. No. 402,165, Oct. 1, 1973, abandoned.

[52] U.S. Cl. ............................ 251/121; 251/123; 251/333; 251/366; 251/335 A
[51] Int. Cl.² ................ F16K 47/04; F16K 41/12
[58] Field of Search ....... 251/333, 122, 121, 335 A, 251/123, 124, 366

[56] References Cited
UNITED STATES PATENTS

| | | | |
|---|---|---|---|
| 1,935,329 | 11/1933 | Needham | 251/366 X |
| 2,144,754 | 1/1939 | Forbes | 251/335 A |
| 2,297,535 | 9/1942 | Bryant | 251/333 |
| 2,382,235 | 8/1945 | Lamar | 251/335 A |
| 3,080,144 | 3/1963 | Baker | 251/121 |

FOREIGN PATENTS OR APPLICATIONS

| | | | |
|---|---|---|---|
| 1,010,060 | 3/1952 | France | 251/366 |
| 611,764 | 4/1935 | Germany | 251/366 |
| 1,080,350 | 4/1960 | Germany | 251/333 |

*Primary Examiner*—Arnold Rosenthal

[57] ABSTRACT

A flow passage providing improved pressure recovery in a valve having an axially movable closure element which includes the provision of an annular diffuser flow passage from the seat port to the periphery of the closure member to reduce the fluid pressure drop across the valve when the closure member is moved a limited distance to its fully open position. The annular diffuser flow passage is provided between a pair of oppositely disposed frusto-conical surfaces respectively provided on the valve body and the closure element. The closure member may also be provided with a convexly shaped projection and the valve flow passage shaped to further reduce the pressure drop across the valve.

4 Claims, 4 Drawing Figures

Fig. 1.
Fig. 2.
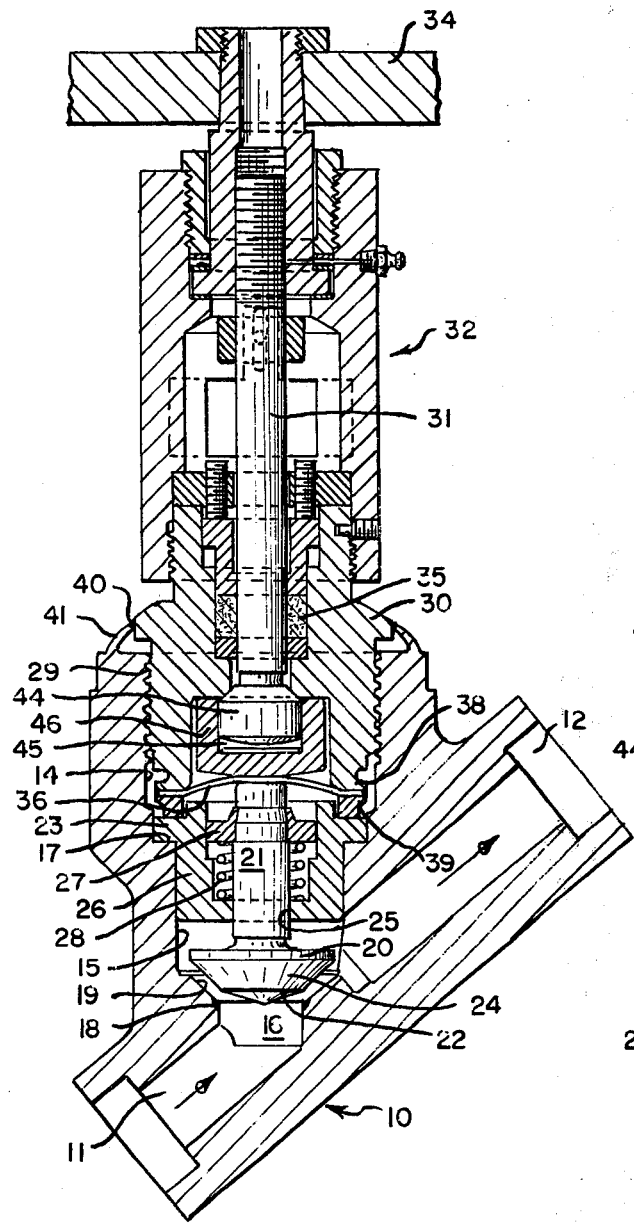
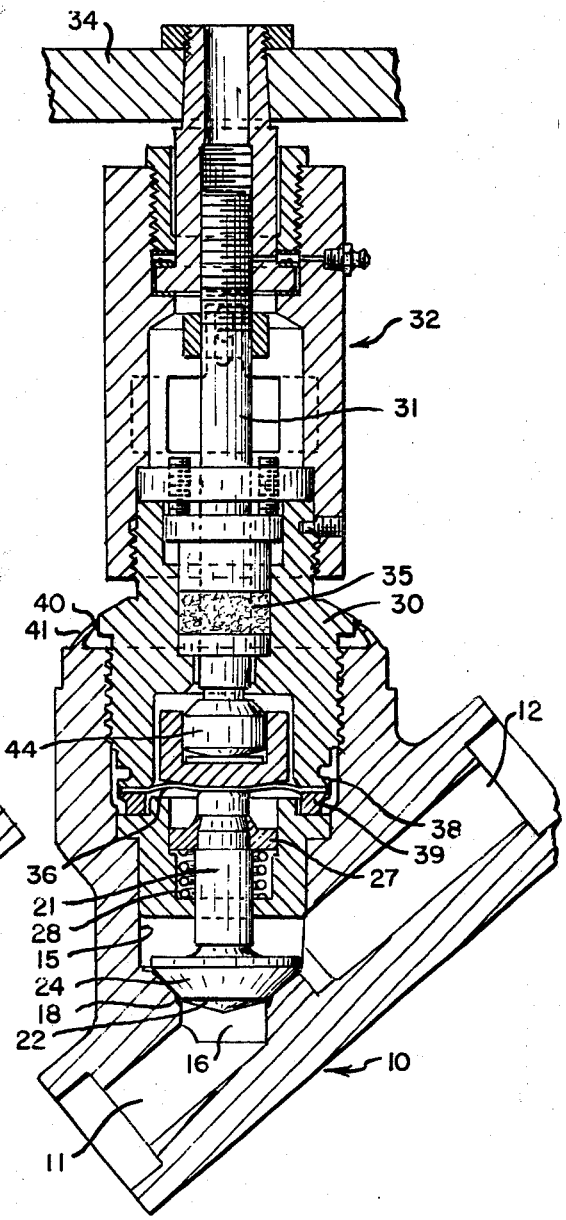

VALVE WITH IMPROVED FLOW PASSAGE

This is a continuation of application Ser. No. 402,165, filed Oct. 1, 1973, now abandoned.

BACKGROUND OF THE INVENTION

This invention is directed to a valve structure and, more particularly, to a novel flow passage between the seat port and outlet port of a valve having an axially movable closure member. More specifically, this invention is directed to a flow passage in a valve body having an axially movable closure member which provides a low fluid pressure drop across the valve when the closure member is moved a limited distance to its fully open position.

Although certain features of this invention may be equally applicable to conventional valves employing an axially movable closure element, this invention is particularly useful in the manufacture of valves which include a sealing element such as a metal diaphragm or bellows type seal between the valve flow passageway and the operating mechanism to protect against external fluid leakage through or around the operating mechanism. Such valves have found considerable utility as isolation or shut-off valves for toxic or otherwise dangerous fluids and for borated water safety systems in nuclear fueled power generating plants. These valves are normally used in the closed position to shut-off or isolate some fluid under pressure from a flow system and in the open position to deliver the pressurized fluid to the flow system. In the open position it is preferred that the pressure drop across the valve be minimized to ensure that the fluid is delivered to the flow system under sufficient pressure to satisfy the requirements of that system.

The fluid pressure drop across a valve is a function of fluid dynamics as applied to the geometry of the flow passageway provided through the valve body which is restricted to some extent by the mass of the body required to contain the fluid pressure and the provision of operating means and a closure member which, even when moved to the fully open position, normally provides some restriction in the cross-sectional area available for fluid flow through the valve. Efforts to reduce the pressure drop across a valve have traditionally taken one or both of two approaches — namely, to open the flow area so the internal restriction will not produce fluid flow of a velocity high enough to dissipate an inordinate amount of fluid pressure in the form of heat energy, or in the case of symmetrical valves having a straight through port in the closure member, to provide a transition region of gradually increasing cross-sectional area in the outlet port of the valve body, see for example U.S. Pat. No. 3,643,914 which issued to E. A. Bake on Feb. 22, 1972. The former has been applied in the design of isolation valves having a disc or globe type closure member axially movable toward or away from a valve seat. That is, the axial distance the closure member is moved away from the seat to open the valve has traditionally been designed to provide a annular orifice of sufficient area to provide a volume of flow which will not dissipate an inordinate amount of pressure force in the form of heat energy. Conventional isolation valves employing axially movable disc or globe type closure members are designed to permit the closure member to move a distance on the order of from about one-fourth to about three-fourths the diameter of the seat port to provide a annular orifice of substantial area around the periphery of the closure member.

Unfortunately, the same degree of axial movement of the closure member relative to the seat port diameter is not economically feasible in a metal diaphragm or bellows sealed valve employing similar principles of operation. The maximum distance the closure element in a metal diaphragm valve can be moved is limited by the axial extent of deformation or flexure of the metal diaphragm. The extent of axial movement provided by a metal diaphragm will depend upon the dimensions and physical characteristics of the diaphragm but it will normally be on the order of about one-eighth the diameter of the seat port or less than about one-half the distance of axial movement preferred for a conventional isolation valve of the same size. The use of a metal diaphragm sealing element thus places a severe restraint on the distance the closure member may be moved from the valve seat to the fully open position and therefore normally increases the fluid pressure drop of the valve by restricting the volume of fluid flow between the closure member and the valve seat. A similar problem exists in the case of a bellows sealed valve where the maximum movement of the closure member is limited to that distance which is permitted by axial movement of a bellows seal of reasonable length.

Thus, the problem of pressure drop in fluid flowing through a metal diaphragm or bellows type isolation valve becomes more acute than that encountered in conventional isolation valve designs employing similar principles of operation by reason of the restricted or limited lift provided to the closure member through either of these sealing means. These and other valves having an axially movable closure member which is moved a maximum axial distance of about one-eighth the diameter of the seat port or less will be referred to hereinafter as "low-lift" valves.

With the foregoing considerations in mind it is a principal purpose and object of this invention to provide a valve having an axially movable closure member with improved pressure recovery in fluid passing therethrough by means of a novel flow passage between the seat port and the outlet port of the valve.

Another object is to provide a flow passage in an isolation valve having a low-lift axially movable closure member which reduces the pressure drop in fluid flowing through the valve in the fully open position.

SUMMARY OF THE INVENTION

This inventon provides an annular diffuser flow passage of gradually increasing cross-sectional area between oppositely disposed surfaces of the closure member and the valve body around the seat port in an isolation valve having an axially movable closure member. The annular diffuser passage serves to restrain the high velocity fluid passing through the annular orifice between the closure member and the seat port from expanding too rapidly and dissipating the flow producing pressure force. In one embodiment, the annular diffuser flow passage is provided between a pair of oppositely disposed frusto-conical surfaces respectively provided on the closure member and the valve body. The oppositely disposed surfaces may be parallel or at a slightly diverging angle to further enhance the effect of the annular diffuser passage. The diffuser passage is preferably arranged to deliver a portion of the fluid flow directly into the outlet port and, in one embodiment, the diffuser passage provides a line-of-sight opening between the inlet and outlet ports of the valve.

The invention also includes the provision of a convexly shaped projection on the closure member, a annular flow space provided around the periphery of and over the rear surface of the closure member, and an oblique surface provided at the intersection of the valve control chamber and outlet port, all of which contribute to an even greater reduction in pressure loss across the valve when provided in combination with the annular diffuser flow passage.

The foregoing objects and features of the present invention and the advantages provided thereby will be more fully understood upon further study of the following description of one embodiment of the invention and the accompanying drawings.

DESCRIPTION OF THE DRAWINGS

In the drawings wherein like numerals represent like parts:

FIG. 1 is a side elevation mainly in section showing a metal diaphragm valve according to the present invention;

FIG. 2 is a view similar to FIG. 1 with the valve shown in the closed position;

DESCRIPTION OF THE INVENTION

Figure 3:
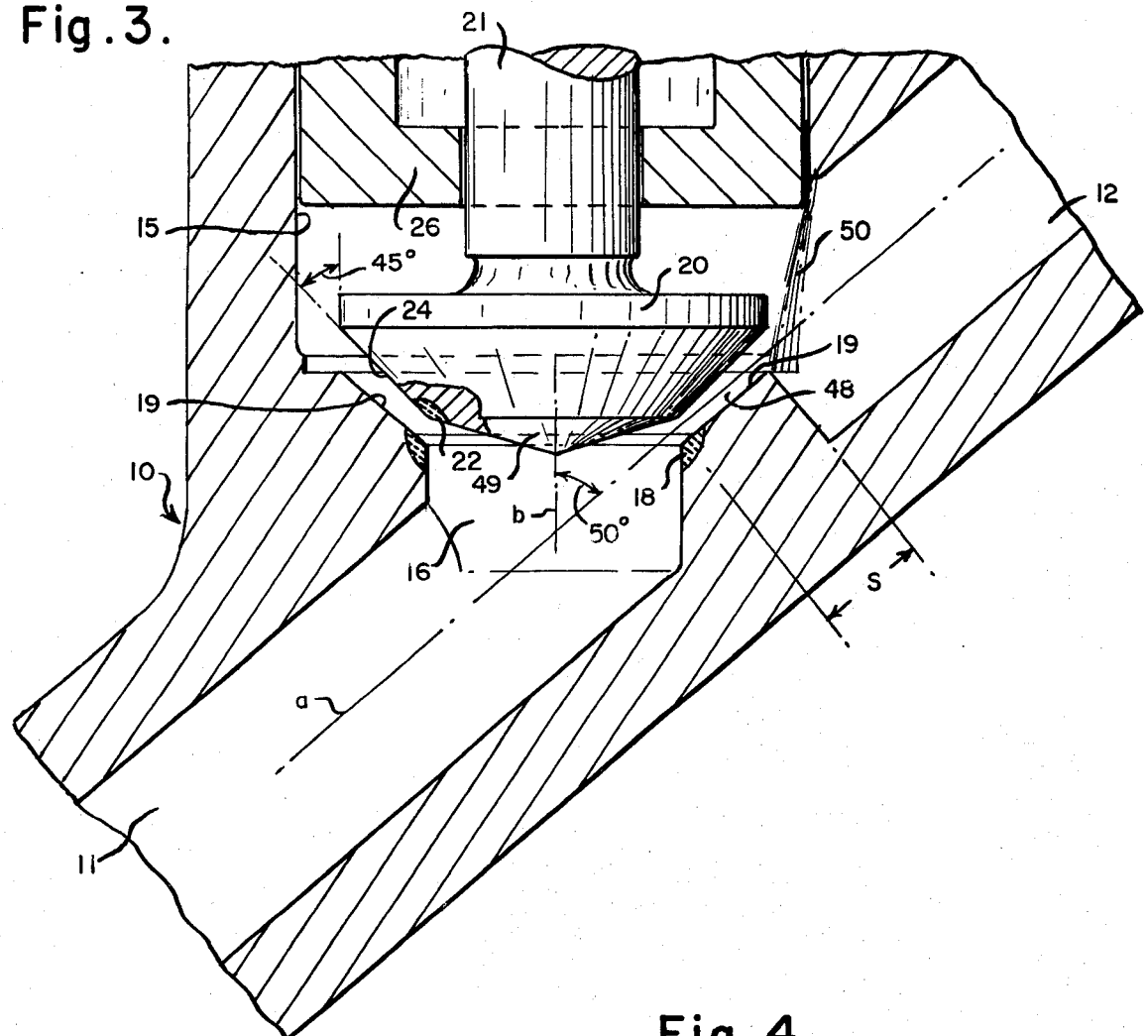
FIG. 3 is an enlarged fragmentary view showing details of the valve closure member and flow passageway of the valve shown in FIG. 1.

Referring now to the drawings, particularly FIGS. 1 and 2, the invention is illustrated as incorporated in a metal diaphragm valve having a valve body 10 provided with an inlet passage or port 11 and an outlet passage or port 12 which communicate at their inner ends with a generally cylindrical control chamber 15 provided at the lower end of a body cavity 14. The body cavity 14, control chamber 15, and an extension 16 of the inlet port 11 are provided by a number of sequential boring operations. The extension 16 provides a circular seat passage or port at the intersection of the inlet port 11 with the control chamber 15. An inlaid hardened valve seat 18 preferably having a frusto-conical surface configuration is provided around the periphery of seat port 16. An outwardly diverging frusto-conical body surface 19 of considerable slant height is provided in contiguous surrounding relationship to the valve seat 18.

A disc closure member 20 having an integral disc stem 21 is mounted for axial movement toward and away from the valve seat 18 in the control chamber 15. The surface of the disc 20 facing the valve seat 18 is provided with a annular seating surface 22 and an outwardly diverging frusto-conical surface 24 disposed opposite to the frusto-conical body surface 19. The annular seating surface 22 is preferably formed of a hardened metal inlaid in the disc surface and adapted to sealingly engage the valve seat 18 when the disc is moved to the closed position as shown in FIG. 2. The disc stem 21 is slidably received in an aperture 25 in a control cartridge 26. Internally of the cartridge 26, the disc stem 21 has a collar 27 swagged thereon. A spring 28 having its opposite ends seated against the collar 27 and the internal surface of control cartridge 26 around aperture 25 provides a biasing force to move the disc 20 to a position spaced from the valve seat 18 to open the valve and permit fluid flow in the direction designated by the arrows shown in FIG. 1.

The upper end of the body cavity 14 is internally threaded at 29 to receive a bonnet 30 including a valve operating stem 31 and mounting an operating mechanism such as a yoke assembly 32 and hand wheel 34 arranged to impart axial movement to the valve operating stem 31. A circular metal diaphragm 36 is disposed between a depending peripheral bonnet flange 38 and a annular ring 39 seated on the upper surface of flange 23 of the control cartridge 26 to prevent leakage through the bonnet assembly. Packing 35 is provided between the valve operating stem 31 and the bonnet bore to seal against leakage around the stem 31 in the event of diaphragm failure. After the bonnet 30 is threaded tightly into the body cavity 14 to positively seat the control cartridge flange 23 against body shoulder 17, a circumferential weld 40 is effected between the bonnet 30 and a lip 14 provided around the body cavity opening 14 to seal against fluid leakage. The valve operating stem at its lower end is provided with an integral collar portion 44 slidably received within the interior opening 45 of a cup-shaped diaphragm plunger 46 positioned interiorly of the bonnet 30.

The present invention is specifically concerned with the flow passage from the seat port 16 to the outlet port 12 when the disc 20 is moved to the fully open position as shown in greater detail in FIG. 3. The oppositely disposed frusto-conical surfaces 19 and 24, which are respectively provided to the valve body 10 and the disc 20, provide an annular diffuser flow passage of a gradually increasing cross-sectional area around the annular space or orifice between the valve seat 18 and the annular seating surface 22 of the disc 20. The annular diffuser passage bounded by the frusto-conical surfaces 19 and 24 permits the fluid to expand gradually without expending an inordinate amount of energy. The fluid is discharged from the annular diffuser flow passage into a region of considerably greater volume around the periphery of the disc 20, but the velocity of the fluid flow is reduced to such an extent at the exit end of the diffuser flow passage that there is only a minimal pressure loss. The gradually increasing cross-sectional area of the annular diffuser flow passage is a function of the increasing diameter of the annular flow passage and may be further enhanced by providing a gradual divergence between the surfaces bounding the annular diffuser passage.

In the embodiment shown in the drawing the outwardly diverging frusto-conical body surface 19 is provided as a frustum of a cone having an included angle of 100° and the disc surface 24 is provided as a frustum of a cone having an included angle of 90°. The surfaces 19 and 24 are thus respectively provided at angles of 50° and 45° to the axis of the control chamber 15 as shown in FIG. 3, and therefore provide a divergence of 5° along the flow length of the annular diffuser passage.

The diffusing effect is also enhanced by the flow length of the annular diffuser passage so it is preferred to provide the oppositely disposed frusto-conical surfaces 19 and 24 with a slant height $s$ as long as possible within the confines of other valve design parameters. A slant height of about one-half the diameter of the seat port 16 is considered satisfactory for valves having a seat port diameter of 1 or 2 inches.

It is also desirable to orient the annular diffuser flow passage to discharge a portion of the fluid flowing therethrough directly into the outlet port of the valve through an opening providing the maximum cross-sectional flow area compatible with other valve design parameters. Flow tests with various modifications in a valve flow passage have shown that the lowest pressure drop can be achieved when the downstream sector of the annular diffuser flow passage is disposed nearly parallel to the axis of the inlet and outlet ports to discharge fluid into the outlet port across the maximum possible width thereof. In the embodiment shown in the drawings, the downstream sector of the annular diffuser flow passage is that portion shown to the right of the disc 20 in the sectional views and designated by the number 48 in FIGS. 3 and 4.

Figure 4:
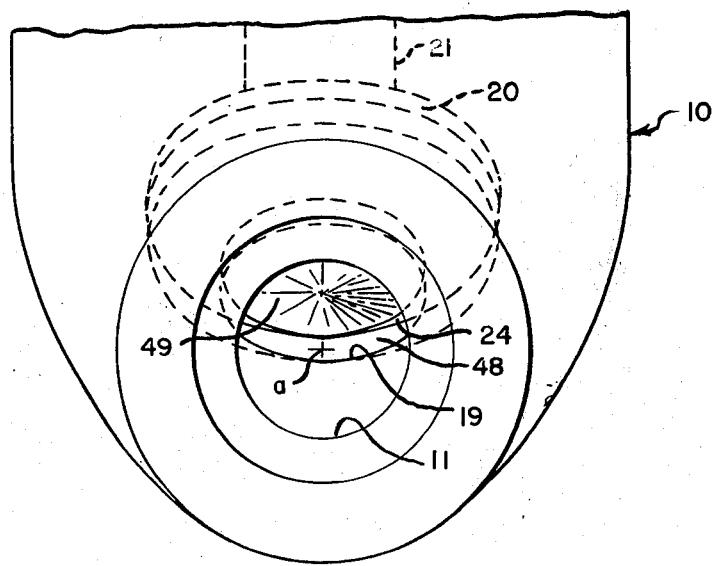
FIG. 4 is a view taken along the axis of the inlet port of the valve as shown in FIG. 1.

The preferred arrangement of the annular diffuser flow passage relative to the inlet and outlet ports of the valve is achieved by centering the inlet port 11 and outlet port 12 on a common longitudinal axis $a$ and disposing the axis $b$ of the control chamber 15 at a substantial angle of inclination (about 50 degrees) to the axis $a$ with the axis $a$ passing through the downstream sector of the annular diffuser flow passage when the disc 20 is moved to the fully open position as shown in FIG. 3. This arrangement produces an arcuate line-of-sight opening 48 between the frusto-conical surfaces 19 and 24 from the inlet port to the outlet port as shown in FIGS. 3 and 4. The arcuate line-of-sight opening 48 provides a straight flow path of maximum cross-sectional area and permits fluid flow directly from the inlet port to the outlet port with minimum turbulence.

Flow tests have also shown that the pressure drop may be reduced by providing the disc 20 with a convexly shaped projection having a slope less than the frusto-conical disc surface 24 to direct fluid flowing through the seat port 16 to the annular orifice provided between the seating surface 22 and the valve seat 18. In the embodiment shown in the drawings, this is accomplished by providing the disc 20 with a projection in the form of a conical section 49 having an included angle of 140° which is substantially greater than the included angle (90°) of the surface 24 and therefore of considerably less slope. The disc projection which is circumferentially bounded by the annular seating surface 22 may be provided in other forms, for example, a spherical section.

Flow tests conducted with other modifications in the flow passageway have shown that it is also desirable to provide a annular clearance space around the periphery of the disc at the exit end of the annular diffuser flow passage and across the stem side of the disc to receive fluid flowing through the annular diffuser passage and convey that fluid to the outlet port. In the embodiment shown in the drawings this is accomplished by providing the control chamber 15 with a diameter greater than the diameter of the disc 20 and by spacing the lower surface of the control cartridge 26 a sufficient distance from the stem side of the disc 20 to provide an annular clearance space around the periphery and across the stem side of the disc 20 to collect and convey fluid to the outlet port 12.

Flow tests have also shown that a sharp edge at the opening formed by the intersecting surfaces of the outlet port 12 and the control chamber 15 can substantially increase the pressure drop in the fluid flowing through the valve. Accordingly, another feature of the improved flow passage of the present invention is to provide a generous chamfer or radius at the opening formed by the intersection of the outlet port 12 with the control chamber 15 to prevent the formation of a vena contracta in the outlet port. A radius of three-sixteenths to five-sixteenths inch, as generally denoted by the numeral 50 in FIG. 3, has been found to be quite satisfactory in a valve having a seat port diameter of 2 inches.

The foregoing features have each provided a significant reduction in the pressure drop in fluid flowing through a valve passage incorporating one or more of these features and have produced a surprising result when all of these features have been incorporated in a valve flow passage in which the seat port is opened by limited axial movement of a closure member. A metal diaphragm valve having a seat port diameter of 2 inches, an axially movable disc limited to a maximum movement of one-fourth inch and a flow passage incorporating the present invention produced a fluid pressure drop comparable to that of a conventional 2 inch isolation valve having an axially movable closure member of considerably greater lift.

Measuring the rate of fluid flow through a valve at a given temperature with a fluid pressure differential of 1 p.s.i. across the valve is an acceptable method for assigning a quantitative value, i.e., $C_v$, to the fluid pressure drop or pressure recovery in fluid flowing through a valve. In this method, a higher rate of fluid flow or high $C_v$ is indicative of a lower fluid pressure drop or greater fluid pressure recovery in the fluid flowing through the flow passage of the valve body.

Flow tests conducted on a 2 inch metal diaphragm valve incorporating the present invention and having a disc lift of only one-fourth of an inch provided a $C_v$ of 59 which is comparable to a $C_v$ of 60 for a conventional 2 inch isolation valve having a disc lift of 1⅜ inches.

The operation of the valve will now be described with reference to FIGS. 1 and 2. In FIG. 1 the valve is shown in the open position with disc 20 spaced from the valve seat 18. In this position the spring 28 urges the collar 27 and disc stem 21 upwardly into engagement with the undersurface of metal diaphragm 36. The opposite side of the diaphragm 36 is in contact with the diaphragm plunger 46 which is seated against the bonnet 30 to prevent further upward movement of the diaphragm 36 and disc stem 21.

To open the valve, hand wheel 34 is rotated to impart axial movement to the valve stem 31 and collar 44. In the valve shown in the drawings this would be a downward movement to deform the metal diaphragm 36 and move the disc stem 21 and disc 20 to close the valve as shown in FIG. 2. In the closed position the annular seating surface 22 of the disc closure member sealingly engages the valve seat 18 to prevent fluid flow through the valve. When it is desired to open the valve, the hand wheel 34 is rotated in the opposite direction to raise the valve stem 31 and collar 44 to the position shown in FIG. 1. The disc 20 is moved to the open position under the biasing force of the spring 28 and the fluid pressure force at inlet port 11.

The invention may be embodied in other specific forms without departing from the spirit and essential characteristics thereof. The previously described embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A metal diaphragm low lift valve comprising: a valve body having an inlet passage and an outlet passage aligned along a common axis; a cylindrical control chamber in the valve body having an axis intersecting said common axis at a substantial angle of inclination; a circular passage in the valve body at one end of the control chamber coaxial therewith and fluidly connecting the inlet passage and the control chamber; a frusto-conical valve seat at said one end of said control chamber, said valve seat diverging outwardly from the circular passage and having a lesser diameter than said control chamber, said valve seat being coaxial with the axis of the chamber, the valve seat having a slant line in a plane of the common axis and the axis of the chamber substantially parallel to and extending a distance below the common axis with the outlet passage being adjacent thereto whereby a straight flow path is established along the common axis between said inlet passage and said outlet passage; means including a metal diaphragm sealing the other end of the chamber; said diaphragm having a limited axial flexure movement; means including a metal diaphragm sealing the other end of the chamber, said diaphragm having a limited axial flexure movement; means for imparting axial flexure movement to the diaphragm; a cylindrical closure disc mounted for movement along the axis of said control chamber in accordance with movement of said diaphragm; an outwardly diverging frusto-conical surface on said closure disc disposed opposite to and coaxially with said frusto-conical valve seat, said frusto-conical surface being diametrically coextensive with the valve seat and diverging outwardly therefrom at a shallow angle, said disc having a lesser diameter than said control chamber so as to establish outwardly thereof a region of considerably greater volume; an annular surface on the closure disc inwardly of the frusto-conical surface for sealingly engaging the inner periphery of the valve seat in a closed position to seal the said circular passage, said closure disc being axially movable along the axis of said control chamber to an open position a limited distance above said common axis as permitted by said limited axial flexure movement of the diaphragm, said closure disc in said open position partially obstructing the projected continuation of the inlet passage and defining an annular diffuser passage having a length of about four times the movement of the disc and a flow area less than the area of said circular passage thereby presenting a flow restriction passage at the entry of diffuser, said open position providing a sector within said projected continuation of the inlet passage providing direct fluid communication with minimum turbulence for a portion of the fluid flow between said inlet passage and said outlet passage, said diffuser passage providing a gradually increasing cross sectional flow area that permits fluid to expand gradually with a reduction of velocity for discharge to the control chamber and outlet passage with minimum pressure loss.

2. The valve recited in claim 1 wherein said limited axial flexure movement is about one-eighth the diameter of the circular passage.

3. The valve recited in claim 1 wherein the shallow angle between the frusto-conical surface is around 5°.

4. The valve recited in claim 1 wherein the closure disc moves equal distances above and below said common axis between said positions.

* * * * *